United States Patent Office 3,140,628
Patented July 14, 1964

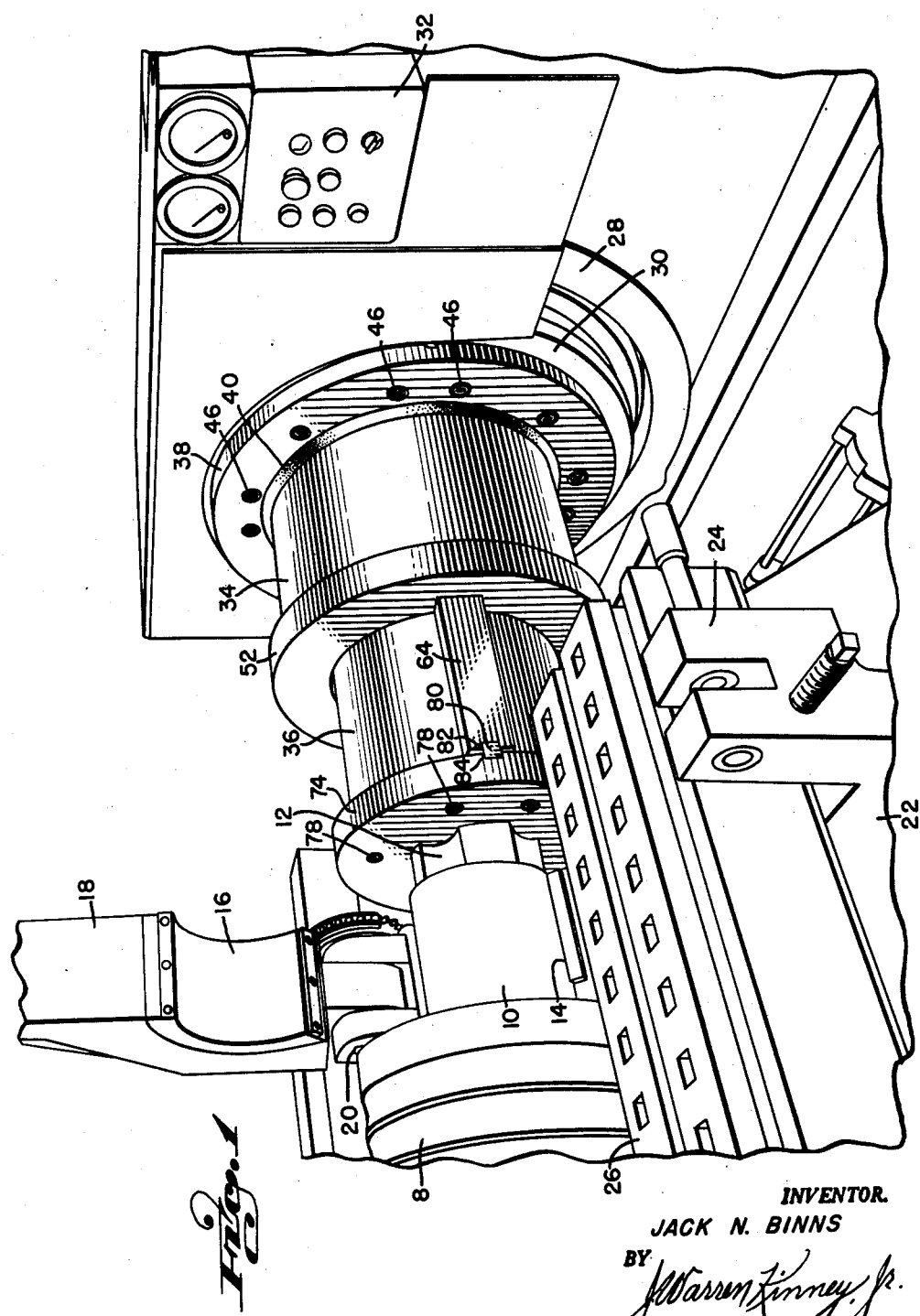

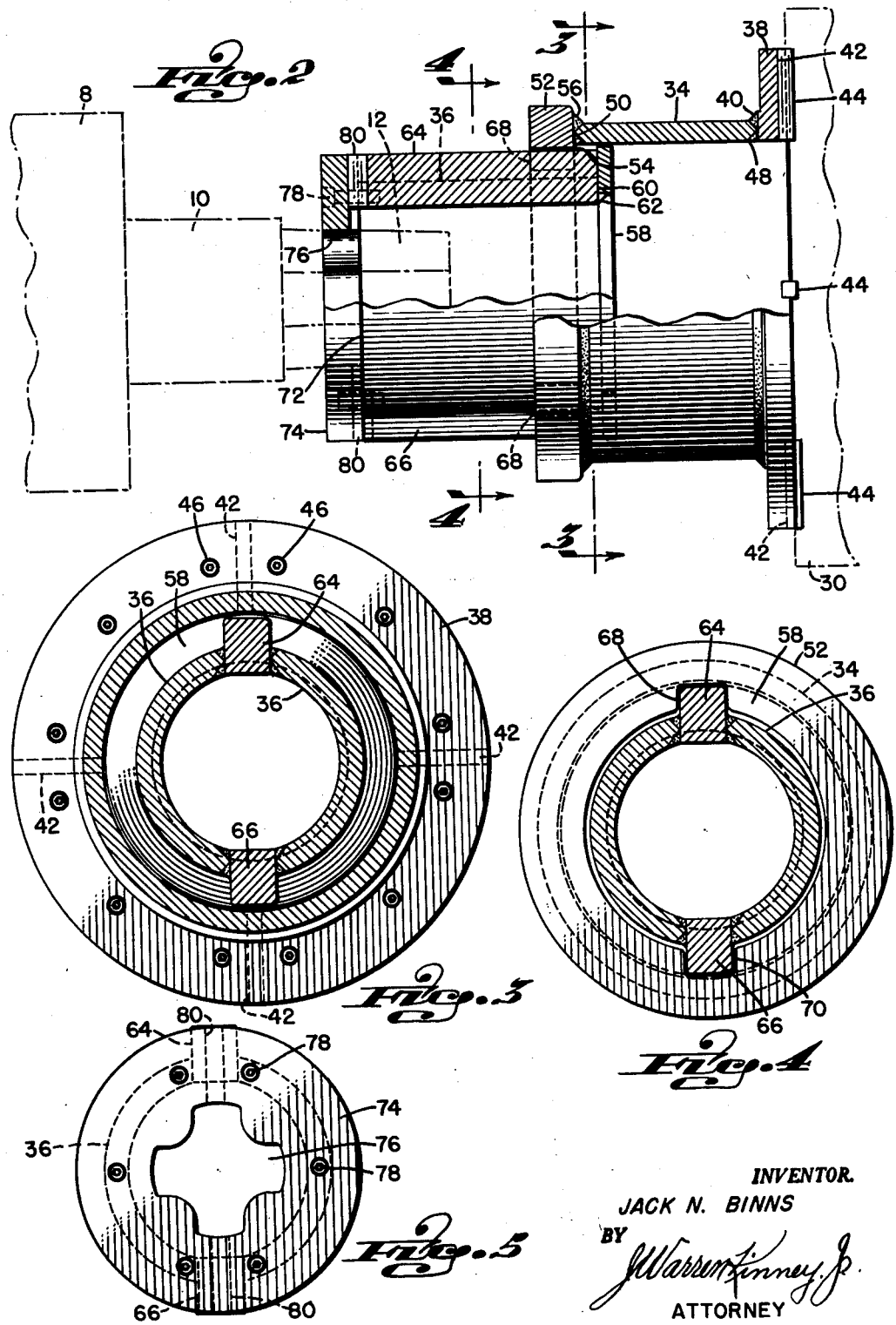

3,140,628
COUPLING BOX ASSEMBLY
Jack N. Binns, 4886 Oaklawn Drive, Cincinnati 27, Ohio
Filed Oct. 26, 1959, Ser. No. 848,691
12 Claims. (Cl. 82—40)

The present invention relates to a coupling box assembly for rotating large and heavy mill rolls or the like, in a lathe, incident to the shaping and finishing of such rolls. Rolls of the character referred to are generally employed in rolling metal sheets, bars, and other shapes, and for other purposes such as milling and grinding in various fields.

An object of the invention is to provide improved means, referred to herein as a coupling box assembly, for application to the headstock of a roll lathe to facilitate and render more reliable the drive between the lathe headstock and the workpiece or roll undergoing turning.

Another object of the invention is to provide a coupling means for transmitting rotation from the headstock to the workpiece with a minimum of torsional deflection, yet affording great flexibility in compensating for angular misalignment or parallel misalignment of the workpiece relative to the headstock center of the roll lathe.

Another object is to provide an improved coupling means of the character and for the purposes stated, which readily may be placed in driving relation with workpieces or rolls notwithstanding marked variations that might be encountered as to the length thereof.

A further object of the invention is to effect substantial savings of time, labor, and expense in placing and setting up the roll or workpiece in the lathe preparatory to machining thereof.

Another object is to improve the quality of the work produced in turning or shaping mill rolls and the like.

The foregoing and other objects are attained by the means described herein and illustrated upon the accompanying drawings, in which:

FIG. 1 is a fragmentary perspective view of the improved coupling box assembly, shown applied to a roll lathe in driving relation with a roll to be machined.

FIG. 2 is a side elevational view of the coupling box assembly, part being broken away.

FIG. 3 is a cross-sectional view taken on line 3—3 of FIG. 2.

FIG. 4 is a cross-sectional view taken on line 4—4 of FIG. 2.

FIG. 5 is a plan view of a coupling or driving plate which constitutes a part of the apparatus.

The perspective view, FIG. 1, illustrates part of a roll lathe which for the purposes of this disclosure may be considered typical. At 8 is shown the roll to be machined, and as is common with mill rolls of certain types, its opposite ends are each developed to provide a neck 10 and a wobbler 12. The neck is supported for rotation upon a bearing 14, there being a similar bearing, not shown, to support the neck at the opposite end of the roll.

A complementary bearing 16, carried by a movable arm 18 pivoted at 20 upon a normally stationary part of the frame 22, may be swung to operative position upon the upper half of neck 10, to securely confine the roll or workpiece for rotation about its axis. In the lowered position of arm 18, its swinging end will be securely locked down at the latch keeper indicated at 24. A rest for the required cutting or shaping tools is indicated generally at 26.

When the roll is chucked within the bearings 14 and 16, the wobbler 12 will be exposed at the bearing end, as usual.

At the right of FIG. 1, the headstock for the lathe is indicated generally by the character 28, and will contain the usual gearing for rotating a face plate or driver 30. Various controls and gauges which form no part of the present invention, are indicated as being mounted upon a panel at 32.

The coupling box assembly of the invention is adapted to transmit rotation of the face-plate 30 to the wobbler 12 at the end of roll 8, in a manner such as to achieve the objectives hereinbefore stated. The assembly may consist of a pair of telescopically related cylindrical parts 34 and 36, referred to herein as the outer box and the inner box, respectively. The outer box 34 may be in the form of a hollow cylinder by preference, having an annular flange 38 fixed upon its rear end 48, as by means of a weld 40. This flange may be provided with radial keyways 42 receptive of keys 44, whereby the flange may be locked against rotation relative to face-plate 30. Flange 38 may be additionally secured to the face-plate by means of screws 46 or other suitable fastening devices.

At its forward end 50, the outer box may carry a retaining member 52, which may be in the form of an annular ring as shown, providing an interior shoulder or stop 54 the purpose of which is to limit extensile movement of the inner box relative to the outer box. The ring or retainer 52 may be fixed upon the forward end of box 34 in any suitable manner, as by means of a weld 56.

The inner box 36 is adapted to telescope within the outer box, and carries means cooperating with ring 52 to limit extensile movement from the outer box. Such means may be in the form of an annular stop ring 58 of slightly larger diameter than the opening of ring 52. Ring 58 may be fixed to the inner end 60 of the inner box, a weld 62 being preferred for the purpose, although other forms of stops might be employed.

Extending longitudinally and exteriorly of the inner box 36, throughout the major portion of its length, is a pair of splines 64 and 66, these splines being slidable within ways or notches 68 and 70 provided in the inner edge of ring 52. Although two spline connections are shown in the drawings, arranged at opposite ends of a diameter of the inner box, the number thereof may be increased if desired. The splines are made quite heavy, to withstand the torque resulting from driving the heavy rolls. As shown in the drawing, FIG. 4, the splines 64 and 66 may be welded to two half sections constituting the inner box 36.

The outer or forward edge 72 of box 36 provides a mount for a plate 74, designated the coupling plate, which is transversely apertured as at 76 complementarily to the cross-sectional shape of wobbler 12. The coupling plate may be secured flatwise against the forward end of box 36 by means of screws 78 or equivalent fasteners. To further lock the coupling plate against rotation relative to box 36, the plate may be keyed thereto as at 80. Key 80 may be embedded partially in the spline 64, and partially in the back of coupling plate 74, keyways 82 and 84 being provided for the purpose. As indicated upon the drawings, two keys 80 may be provided, at opposite ends of a diameter of the coupling plate.

The coupling plate 74 is to be detachably mounted upon the inner box, for it is subject to wear and replacement. Also, it may sometimes become necessary to substitute one form of coupling plate for another, due to differences in the form of wobblers which may characterize some of the rolls 8. Removal of the coupling plate moreover is necessary for assembly and disassembly of the coupling apparatus, as is evident.

From the disclosure of FIGS. 1 and 2, it will readily be appreciated that wobbler 12 may be promptly freed of its driving connection with faceplate 30, by the mere bodily shifting of inner box 36 to the right until the wobbler leaves the shaped opening 76 of coupling plate 74. Restoration of the driving connection is just as easily accomplished, by bodily shifting the box 36 to the left, with the coupling plate opening in register with wobbler 12, whereby the edge of the opening will ride on the wobbler and any lateral misalignment of the roll or wobbler with respect to the rotary axis of the face plate or driver 30 will be compensated by a radial or transverse shifting of coupling plate 74 and inner box 36 with respect to the common axis of outer box 34 and face plate 30.

In view of the manner in which the device of the invention is constituted, it will be seen to provide for connection and disconnection with the roll wobbler with great ease and dispatch, thereby effecting substantial savings of time, labor, and expense in setting up the machine for production. The design of the coupling device is highly favorable to great durability, and the absence of damaging twist under load, so that high torque transmission is achieved with a minimum of torsional deflection. Yet, by reason of the telescopic arrangement disclosed, the drive may be established without difficulty even though the roll may be somewhat misaligned angularly with respect to the face plate axis, or the wobbler end disposed in offset parallelism with the axis of rotation of the face plate.

As disclosed in FIGS. 3 and 4, the outside diameter of inner box 36 is considerably less than the inside diameter of outer box 34 and the inside diameter of annular retaining member 52 which is fixed to the forward end of outer box 34. This loose relationship enables the inner box to be freely shifted or moved both radially and axially relative to the outer box to produce, in effect, an efficient universal joint which will automatically compensate for axial misalignment between the axis of rotation of face plate 30, to which the outer box 34 is fixedly mounted, and wobbler 12 of a roll 8.

As evident from FIG. 2, the axial width of coupling plate 74 in which the transverse, wobbler-receptive aperture 76 is disposed, is quite narrow compared with the length of wobbler 12.

It should be understood that whereas it is desirable for the axis of rotation of necks 10 of rolls 8 to coincide with the axis of rotation of face plate 30 of the headstock 28, in actual practice it is not uncommon, because of wear of bearings 14 and 16, for the axis of rotation of necks 10 to be misaligned by as much as one-half inch from the axis of rotation of the face plate. It should also be understood that whereas the neck rolls 10 are carefully machined to close tolerances and are concentric with roll body 8, the wobbler 12, which is cast as an integral part of a roll, is not necessarily concentric with the roll or the roll-necks, since in practice the wobblers are not held to close tolerances nor are they machined. Therefore, it is the rule, rather than the exception, for wobbler 12 to be eccentric with reference to the axis of rotation of its own neck 10.

The coupling box assembly of the present invention is so constructed and arranged as to effectively transmit torque from a face plate 30 to wobbler 12 of a roll 8 even though the wobbler is eccentrically disposed relative to the axis of rotation of the roll and the face plate; or stated differently, the coupling box assembly compensates for axial misalignment between the axis of rotation of face plate 30 and wobbler 12 of roll 8.

Use of the improved coupling device has been found highly effective in eliminating chatter and vibration during the machining operation, so that a high grade of accuracy and finish is attained. Of considerable merit also is the ease with which the improved coupling box may accommodate wobblers that extend different distances beyond the bearing necks 10, such variations being readily compensated for in the telescopic length adjustment of the coupling.

It is to be understood that various modifications and changes in the structural details of the device may be made, within the scope of the appended claims, without departing from the spirit of the invention.

What is claimed is:

1. A coupling device for transmitting rotation of a roll lathe face-plate to a longitudinal non-circular extension of a roll work piece subject to turning in the roll lathe, said device consisting in combination of a coupling plate having a transverse aperture substantially conforming in contour to the cross sectional contour of the non-circular roll extension to be received therein and into and through which aperture said extension may slide longitudinally to have peripheral driven engagement with the edge of the aperture, and means loosely supporting the coupling plate independently of its engagement with the extension of a roll workpiece and for radial and axial movement relative to the axis of rotation of the face plate and in driven connection with the latter, for compensating for angular and for parallel offset of each of the axis of rotation of said face plate and the said roll workpiece extension.

2. A coupling device for transmitting rotation of a roll lathe face-plate to the wobbler of a roll subject to turning in the roll lathe, comprising in combination, a coupling plate transversely apertured in substantial conformity with the cross sectional shape of a wobbler to be received therein, and within which aperture the wobbler may slide longitudinally, a plurality of coupling boxes telescopically slidable one within another, there being an inner box and an outer box, means associated with said boxes providing axial and radial movement of the inner box relative to the outer box and precluding relative rotation of the boxes, means fixing the coupling plate upon the inner one of the boxes, with the relative sliding movement of said inner box adapted to compensate for axial misalignment between the face-plate of the lathe and the wobbler received in the coupling plate aperture, and means for fixing the outer coupling box to the face-plate of a lathe for rotation therewith, the inner box being telescopically contractible to free the wobbler from the coupling plate aperture.

3. The coupling device as set forth in claim 3, in which the telescopic boxes are provided with cooperative means for maintaining the inner box for freedom of axial misalignment at all extended positions thereof.

4. The coupling device as set forth in claim 2, wherein the means securing the coupling plate upon the inner box comprises a detachable connection, whereby substitute coupling plates may be applied selectively.

5. A lathe for the turning of large heavy rolls which carry at their ends a wobbler, said lathe comprising in combination, bearing means to rotatably support a roll, with the wobbler extending beyond the bearing means, a driven face-plate on the lathe having an axis of rotation substantially aligned with the axis of the roll, a coupling plate transversely apertured in substantial conformity with the shape of the wobbler, and into and through which aperture the wobbler is slidably received, a plurality of coupling boxes telescopically slidable one within the other whereby there are provided two remote box ends, means associated with said boxes precluding relative rotation of the boxes, means fixing the coupling plate upon the remote end of one of the boxes, with the axis of sliding movement of said one box variable radially and angularly with the center of the face plate, and means securing the other remote coupling box end to the lathe face-plate for rotation therewith.

6. A coupling box assembly for attachment to the head stock face plate of a roll lathe for establishing a driving connection between a wobbler end of a roll and the lathe face plate, said assembly comprising an inner and an outer cylinder, means forming a mounting flange on one end of the outer cylinder, means for attaching said flange to a lathe face plate with the attached cylinder concentric with the rotary axis of the place plate, the inner cylinder having an outside diameter materially less than the inside diameter of said outer cylinder, a retaining plate secured to the other end of said outer cylinder and having a circular opening therethrough of smaller diameter than the inside diameter of said outer cylinder to provide an inside stop shoulder, said inner cylinder having an end slidably extended through the opening of said retaining plate to position an end of the said inner cylinder within said outer cylinder, means carried upon the end of said inner cylinder within said outer cylinder for engagement with said inside stop shoulder to limit sliding movement of said inner cylinder outwardly through said retaining plate, means for maintaining said cylinders in loose alignment during axial movement of one cylinder relative to the other, means carried by the outer cylinder engaging the inner cylinder for transmitting torque from the outer cylinder to the inner cylinder, and a coupling plate secured to the outer end of said inner cylinder and having an opening substantially conforming to but larger than the cross sectional contour of the wobbler of a roll to receive said wobbler, said inner cylinder mounted for radial and angular movement relative to the outer cylinder and wobbler to accommodate axial misalignment between the outer cylinder and wobbler of a roll.

7. The invention according to claim 6, wherein the said means for limiting sliding movement of said inner cylinder outwardly through said retaining plate comprises an annular member secured to the inner end of said inner cylinder and having an outside diameter materially greater than the outside diameter of said inner cylinder and slightly less than the inside diameter of said outer cylinder.

8. The invention according to claim 6, wherein the said means for maintaining loose alignment of the cylinders comprises at least two splines carried by and extending longitudinally of and projecting from the outer surface of said inner cylinder and engaging in guide ways formed in the edge of the said opening in the said retaining plate.

9. The invention according to claim 6, with means for detachably securing said coupling plate to the outer end of said inner cylinder for facilitating the substitution of coupling plates having wobbler receiving openings of different sizes.

10. A coupling device for transmitting turning torque from the face plate of a roll lathe to the wobbler of a roll mounted for rotation in the roll lathe and for compensating for axial misalignment between the axis of rotation of said face plate and wobbler, comprising in combination, an outer coupling box, an inner coupling box telescopically slidable within said outer box, a coupling plate secured to and carried by the inner box, said plate being transversely apertured in substantial conformity with the cross-sectional shape of a wobbler to be loosely received therein, means associated with said boxes providing relative axial and radial movement therebetween, means securing the inner box in driven relationship with the outer box, and means securing the outer coupling box to, in driven relationship and in axial alignment with the face plate of a roll lathe.

11. A coupling box assembly for simultaneously transmitting turning torque from the face plate of a roll lathe to the wobbler of a roll mounted for rotation in the roll lathe and compensating for axial misalignment between the axis of rotation of said face plate and wobbler, comprising in combination, an outer coupling box, an inner coupling box telescopically slidable within said outer box, means associated with said boxes providing axial and radial relative movement therebetween, means precluding relative rotation of said boxes, a coupling plate transversely apertured in substantial conformity with the cross-sectional shape of a wobbler to be loosely received therein and within which aperture the wobbler may slide both radially and longitudinally, means fixing the coupling plate to said inner box, and means securing the outer coupling box to, in driven relationship and in axial alignment with the face plate of a roll lathe.

12. A lathe for the turning of large heavy rolls having necks which terminate in a wobbler, said lathe comprising in combination a bed, bearing means secured relative to said bed to rotatably support a roll at the necks thereof with the wobblers extending outwardly beyond the bearing means, a headstock at one end of said bed including a driven face plate having an axis of rotation in substantial axial alignment with the axis of said bearing means, and a coupling box assembly forming a driving connection between the face plate and a wobbler of a roll, said assembly including an outer coupling box fixedly secured to and carried by the face plate, an inner coupling box in and supported by said outer coupling box and loosely coupled to and in driving relation with the outer coupling box and having axial and radial movement relative thereto, and a coupling plate having a transverse aperture of a contour substantially conforming with the cross-sectional contour of a wobbler, whereby a driving coupling is established between the edge of the aperture of the coupling plate and a wobbler extending into the aperture, means fixing the coupling plate to said inner box, said inner box providing a telescopic driving connection between, and for accommodating radial and axial mis-alignment of, said outer coupling box and wobbler.

References Cited in the file of this patent

UNITED STATES PATENTS

| 137,298 | Ferrin | Apr. 1, 1873 |
| 1,032,705 | Ross | July 16, 1912 |
| 1,517,580 | Petoskey | Dec. 2, 1924 |
| 1,907,938 | Storm | May 9, 1933 |
| 1,938,759 | Ernst | Dec. 12, 1933 |
| 2,010,662 | Geer | Aug. 6, 1935 |
| 2,371,934 | St. Marie | Mar. 20, 1945 |
| 2,435,451 | LeTourneau | Feb. 3, 1948 |
| 2,745,167 | Cross | May 15, 1956 |
| 2,769,323 | O'Malley | Nov. 6, 1956 |

FOREIGN PATENTS

| 424,890 | Germany | Feb. 5, 1926 |

OTHER REFERENCES

Webster's New Collegiate Dictionary, G & C Merriam Co., 1956.